(12) United States Patent
Johnson et al.

(10) Patent No.: US 12,334,967 B2
(45) Date of Patent: Jun. 17, 2025

(54) RECEIVER WITH SELECTED SUPPRESSION OF PROPAGATING SIGNALS

(71) Applicant: The United States of America, as represented by the Secretary of the Navy, San Diego, CA (US)

(72) Inventors: Nicholas Thomas Johnson, San Diego, CA (US); Michael Paul Civerolo, San Diego, CA (US); Christopher L. Lichtenberg, Carlsbad, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 370 days.

(21) Appl. No.: 18/180,640

(22) Filed: Mar. 8, 2023

(65) Prior Publication Data
US 2024/0305324 A1 Sep. 12, 2024

(51) Int. Cl.
*H04B 1/10* (2006.01)
(52) U.S. Cl.
CPC .................................. *H04B 1/1036* (2013.01)
(58) Field of Classification Search
CPC .................................................... H04B 1/1036
See application file for complete search history.

(56) References Cited

U.S. PATENT DOCUMENTS

| | | | |
|---|---|---|---|
| 5,412,690 A * | 5/1995 | Kotzin | H04L 27/00 375/256 |
| 5,691,978 A | 11/1997 | Kenworthy | |
| 8,121,550 B2 * | 2/2012 | Goldblatt | H04B 7/18517 455/63.1 |
| 8,829,907 B2 * | 9/2014 | Signorelli | G01V 3/30 702/10 |
| 10,084,496 B2 | 9/2018 | Clark | |
| 11,515,906 B2 * | 11/2022 | Choi | H04B 1/0067 |
| 2012/0155373 A1 * | 6/2012 | Yokomakura | H04B 7/15521 370/315 |
| 2017/0131335 A1 * | 5/2017 | Pratt | H04B 17/391 |

* cited by examiner

*Primary Examiner* — Lewis G West
(74) *Attorney, Agent, or Firm* — Naval Information Warfare Center Pacific; Kyle Eppele

(57) ABSTRACT

A compound receiver receives radio-frequency electromagnetic or other propagating radiation. A filter generates a filtered electrical signal representing at least one selected electromagnetic signal isolated from a monitored electrical signal. A transmitter retransmits, with a specified timing, the selected electromagnetic signal or signals represented within the filtered electrical signal. A protected receiver receives a combination of the electromagnetic signals and the selected electromagnetic signal or signals retransmitted from the transmitter. The protected receiver generates a detected electrical signal representing the combination. A relative position sensor adjusts the specified timing to suppress or cancel the selected electromagnetic signal or signals represented within the detected electrical signal.

20 Claims, 3 Drawing Sheets

RECEIVER WITH SELECTED SUPPRESSION OF PROPAGATING SIGNALS

FEDERALLY SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 112297.

BACKGROUND OF THE INVENTION

Radio-frequency receivers rely on frequency selective hardware components to receive specific signals and exclude signals outside of the frequency bands of interest. These receivers often include signal processing algorithms that remove unwanted signals. These traditional methods for removing interfering signals are effective under certain but not all circumstances. For example, a strong interfering signal may saturate the receiver, impeding the receiver's ability to receive a desired weaker signal.

SUMMARY OF THE INVENTION

A compound receiver receives radio-frequency electromagnetic or other propagating radiation. A filter generates a filtered electrical signal representing at least one selected electromagnetic signal isolated from a monitored electrical signal. A transmitter retransmits, with a specified timing, the selected electromagnetic signal or signals represented within the filtered electrical signal. A protected receiver receives a combination of the electromagnetic signals and the selected electromagnetic signal or signals retransmitted from the transmitter. The protected receiver generates a detected electrical signal representing the combination. A relative position sensor adjusts the specified timing to suppress or cancel the selected electromagnetic signal or signals represented within the detected electrical signal.

BRIEF DESCRIPTION OF DRAWINGS

Throughout the several views, like elements are referenced using like references. The elements in the figures are not drawn to scale and some dimensions are exaggerated for clarity.

DETAILED DESCRIPTION

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The disclosed receivers suppress or cancel the unwanted signal before the unwanted signal enters the protected receiver's processing chain. This enables the removal of extremely high-power interfering signals without degradation or damage to the receiver hardware. An additional benefit is that an existing receiver needs no alteration or retrofitting to achieve protection from such interfering signals, reducing the required hardware and processing burden of the protected receiver.

Figure 1:
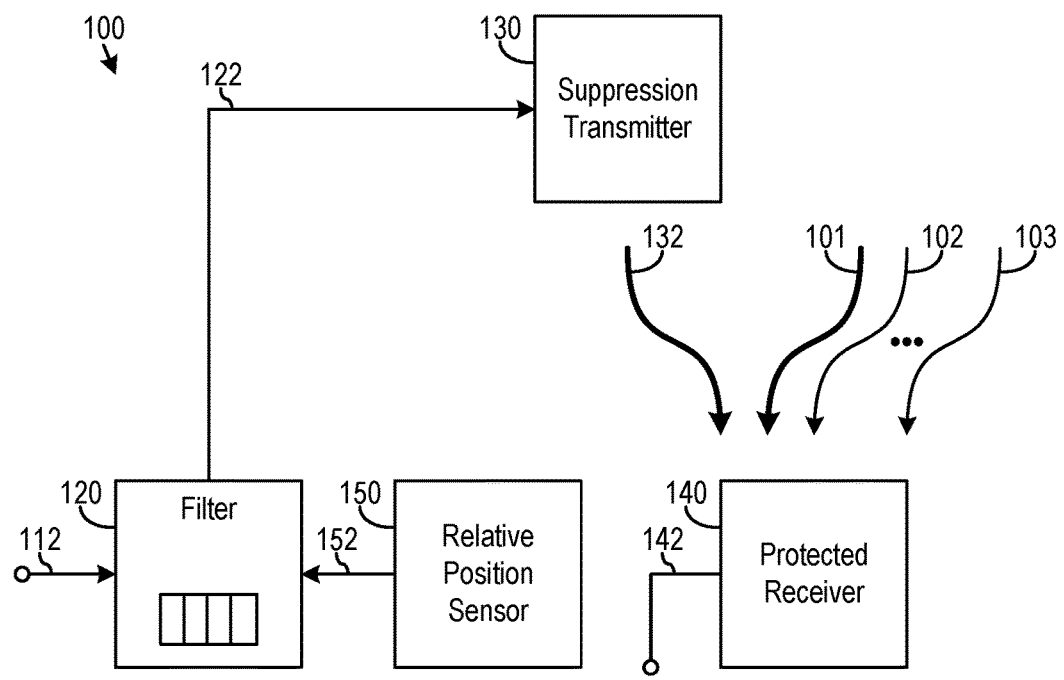
FIG. 1 is a block diagram of a compound receiver of propagating signals in accordance with an embodiment of the invention.

FIG. 1 is a block diagram of a compound receiver 100 of propagating signals 101 and 102 through 103 in accordance with an embodiment of the invention. For illustrative purposes, the heavy line of propagating signal 101 indicates a strength that prevents successfully receiving weak propagating signal 103. In one embodiment, propagating signal 101 is an electromagnetic signal of radio-frequency radiation with an amplitude saturating protected receiver 140 if the gain of protected receiver 140 was high enough to receive weak electromagnetic signal 103 successfully, so an automatic gain control of protected receiver 140 selects a lower gain, preventing successfully receiving weak electromagnetic signal 103. Because compound receiver 100 suppresses or cancels strong propagating signal 101, the compound receiver 100 automatically increases gain and successfully receives weak electromagnetic signal 103. In another embodiment, propagating signal 101 is a strong acoustic signal.

Figure 2:
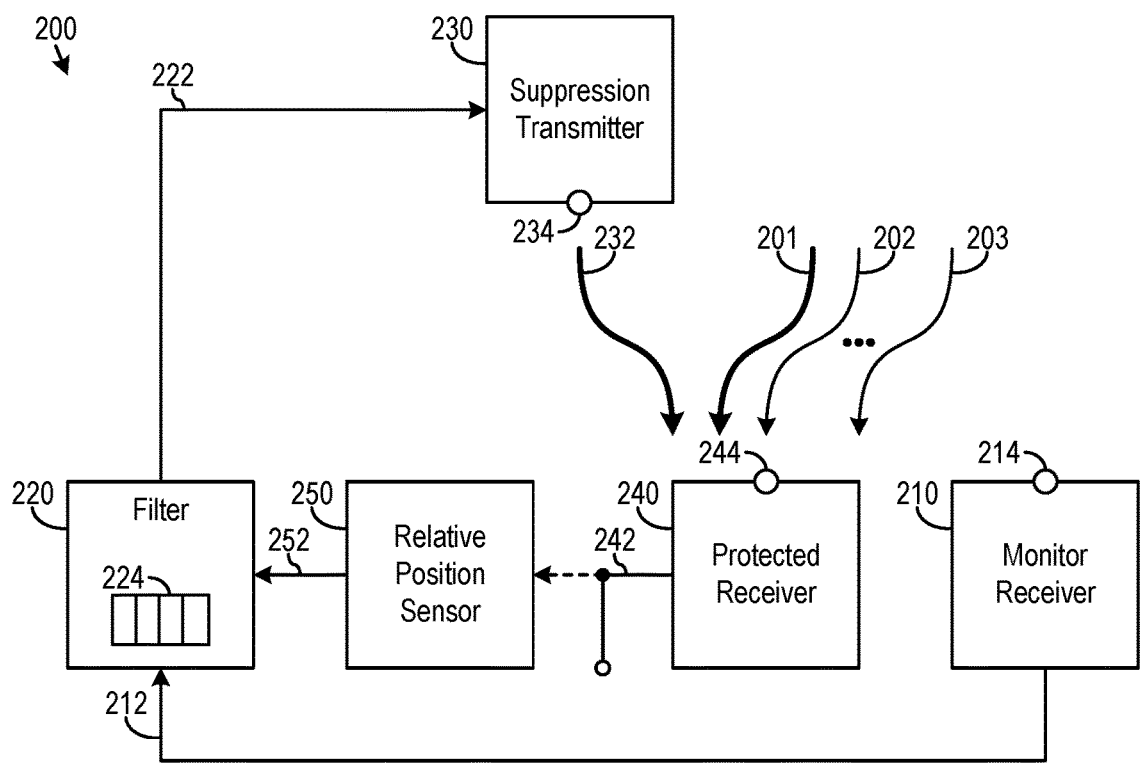
FIG. 2 is a block diagram of a compound receiver of propagating signals in accordance with an embodiment of the invention.
Figure 3:
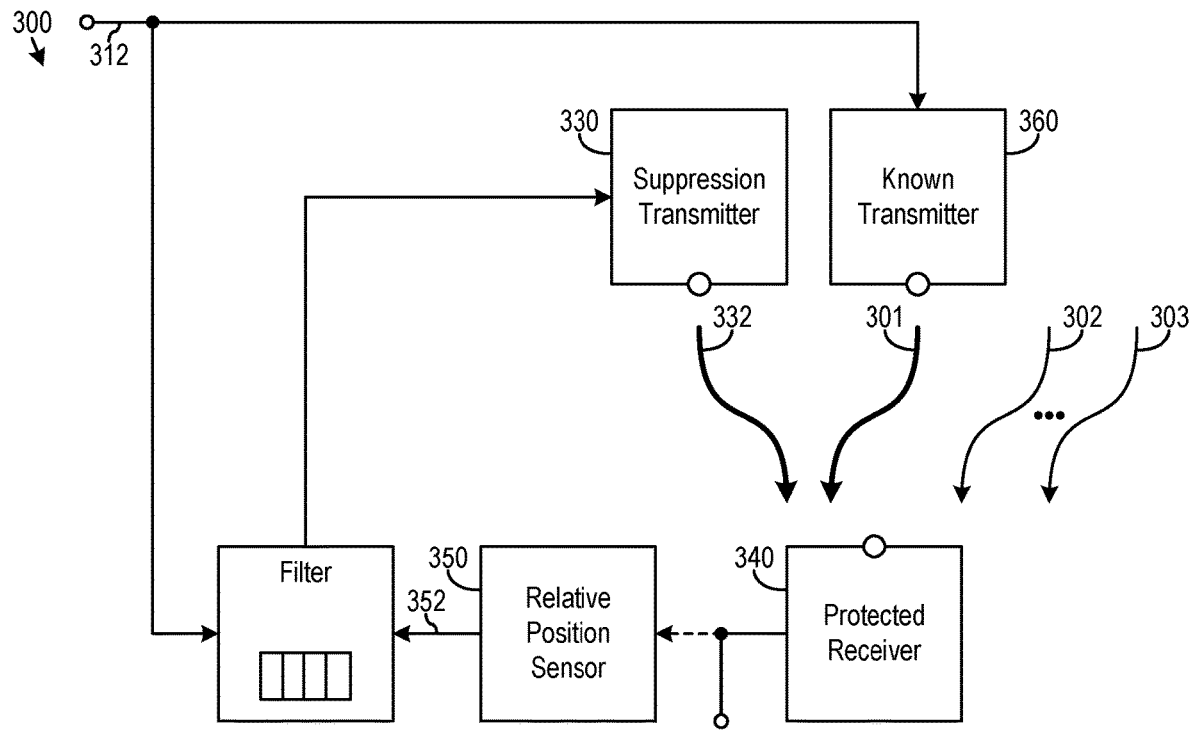
FIG. 3 is a block diagram of a compound receiver of electromagnetic signals in accordance with an embodiment of the invention.
Figure 4:
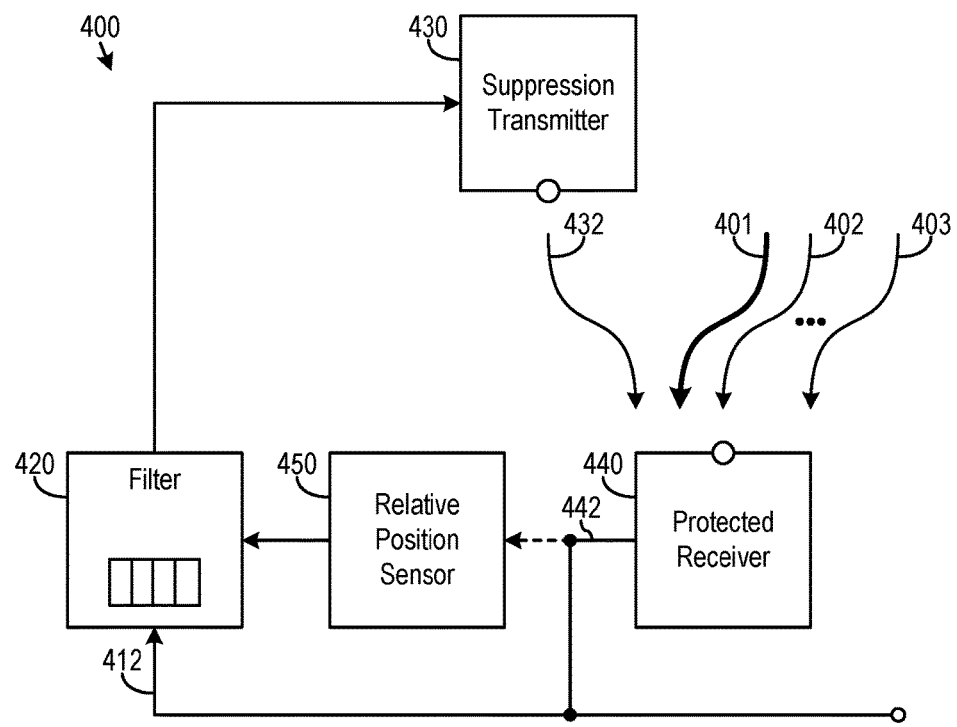
FIG. 4 is a block diagram of a compound receiver of electromagnetic signals in accordance with an embodiment of the invention.

A filter 120 generates a filtered electrical signal 122 representing at least one selected propagating signal 101 isolated from a monitored electrical signal 112. In one embodiment, a monitor receiver generates the monitored electrical signal 112 as shown in FIG. 2. In another embodiment, a known transmitter transmits the selected propagating signal provided from the monitored electrical signal 112 as shown in FIG. 3. In yet another embodiment, the protected receiver generates the monitored electrical signal 112 as shown in FIG. 4.

A transmitter 130 retransmits the selected propagating signal 101 represented within the filtered electrical signal 122 as the selected propagating signal 132. In one embodiment, the transmitter 130 includes the necessary radio-frequency hardware to filter, mix, and/or amplify digitally conditioned signals and send the result towards the protected receiver 140. The transmitter 130 retransmits the selected propagating signal 132 with a specified timing 152 from a relative position sensor 150. The filtered electrical signal 122 can represent multiple propagating signals including the selected propagating signal 101, and then the transmitter 130 retransmits each of these multiple propagating signals with a respective timing 152 from the relative position sensor 150.

A protected receiver 140 receives a combination of the propagating signals 101 and 102 through 103 and the selected propagating signal 132 retransmitted from the transmitter 130. The protected receiver 140 generates a detected electrical signal 142 representing the combination. The relative position sensor 150 adjusts the specified timing 152 to suppress the selected propagating signal 101 represented within the detected electrical signal 142. Preferably in one embodiment, the selected propagating signal 132 retransmitted from the transmitter 130 spatially cancels the selected propagating signal 101 within an aperture of a protected antenna of the protected receiver 140. When the filter 120 selects multiple propagating signals 101 and 102 as interfering signals needing suppression, for each one of the interfering signals 101 and 102, the relative position sensor 150 adjusts the specified timing 152 to suppress each of the interfering signals 101 and 102 represented within the detected electrical signal 142.

FIG. 2 is a block diagram of a compound receiver 200 that receives propagating signals 201 and 202 through 203 in accordance with an embodiment of the invention. In FIG. 2, a monitor receiver 210 generates the monitored electrical signal 212.

The monitor receiver 210 receives the propagating signals 201 and 202 through 203 (and usually the selected propagating signal 232 retransmitted from the transmitter 230). The monitor receiver 210 generates a monitored electrical signal 212 representing the propagating signals 201 and 202 through 203. The filter 220 generates a filtered electrical signal 222 representing at least one selected propagating signal 201 isolated from the propagating signals 201 and 202 through 203 represented within the monitored electrical signal 212. A transmitter 230 retransmits the selected propagating signal 232 or signals represented within the filtered electrical signal 222 or signals with a specified timing 252 from a relative position sensor 250.

A protected receiver 240 receives a combination of the propagating signals 201 and 202 through 203 and the selected propagating signal 232 or signals retransmitted from the transmitter 230. The protected receiver 240 generates a detected electrical signal 242 representing the combination. The relative position sensor 250 adjusts the specified timing 252 to suppress the selected propagating signal 201 represented within the detected electrical signal 242.

For illustrative purposes, consider a simplified scenario where an interfering electromagnetic signal 201 is an ideal sinusoid of initially unknown frequency, amplitude, and phase. From the ambient electromagnetic signals 201 and 202 through 203, the monitor receiver 210 generates a monitored electrical signal 212 representing the interfering electromagnetic signal 201 and the other ambient electromagnetic signals 202 through 203. Suppose the filter 220 spectrographically separates the monitored electrical signal 212 over a range of frequency bins 224, and the filter 220 assigns only the ideal sinusoid of the interfering electromagnetic signal 201 to a particular frequency bin, which is earmarked as interference needing suppression. To suppress, the transmitter 230 retransmits the interfering electromagnetic signal 232 from the particular bin with the specified timing 252.

If the original interfering electromagnetic signal 201 and its retransmission as the suppressing electromagnetic signal 232 from the transmitter 230 are considered independent signals, the protected receiver 240 generates a detection signal 242 representing the original interfering electromagnetic signal 201 and its retransmission with respective amplitudes and respective phases at some reference point, such as the output of the protected receiver 240. If the respective amplitudes have equal magnitudes with opposite signs and the respective phases are equal, then the interfering electromagnetic signal 201 becomes completely canceled. Alternatively, when the interfering electromagnetic signal 201 has symmetric positive and negative portions as is typically observed for a narrowband propagating signal like the ideal sinusoid, if the respective amplitudes are equal and the respective phases are 180 degrees out of phase, then the interfering electromagnetic signal 201 also becomes completely canceled.

However, the compound receiver 200 need not completely cancel the interfering electromagnetic signal 201 because all that is needed is to reduce the strength of the interfering electromagnetic signal 201 enough to allow detection of the other ambient electromagnetic signals 202 through 203 within the dynamic range of the protected receiver 240. Thus, partial cancelation is completely effective given a single interfering electromagnetic signal 201 so long as the apparent strength of the interfering electromagnetic signal 201 is reduced to or below the strength of the second strongest signal 202. Therefore, effective partial cancelation tolerates errors in the frequency, amplitude, and phase of the retransmitted interfering electromagnetic signal 232.

The frequency error is typically low. The transmitter 230 retransmits the interfering electromagnetic signal 232 after filter processing delays, so the frequency error is low so long as the frequency of the interfering electromagnetic signal 201 is essentially constant over a time duration equaling the processing delay through the filter 220. Due to the typically short delay for filter processing of typically hundreds of cycles of the interfering electromagnetic signal 201, the frequency error is low even for an interfering electromagnetic signal 201 that is frequency modulated or has a swept frequency.

The amplitude error originates in gain differences between the direct and retransmitted paths for the interfering electromagnetic signal 201. Because the electronic amplification gains are well defined, typically the amplitude error principally originates in relative movement between a directional antenna 214, 234, and/or 244 and the source of the interfering electromagnetic signal 201. In this embodiment where the transmitter 230 retransmits the interfering electromagnetic signal 201 received at a monitor antenna 214 as the suppressing electromagnetic signal 232, the amplitude error is low when the antenna gains are matched across the fields of view of the monitor and protected antennas 214 and 244.

Typically, minimizing the phase error is more important and challenging than minimizing the frequency error or the amplitude error. The phase error originates in path length differences including signal processing delays between the direct and retransmitted paths for the interfering electromagnetic signal 201. The relative position sensor 250 accounts for the path length differences between the direct and retransmitted paths. The relative position sensor 250 attempts to get the transmitter 230 retransmitting the interfering electromagnetic signal 232 with polarity inverted and the same phase as the original interfering electromagnetic signal 201 as directly received at the protected antenna 244 of the protected receiver 240. Alternatively, the relative position sensor 250 attempts to get the transmitter 230 retransmitting the interfering electromagnetic 232 with the same polarity and phase shifted by 180 degrees from the original interfering electromagnetic signal 201 as directly received at the protected antenna 244 of the protected receiver 240.

Again, perfect phase manipulation between the interfering electromagnetic signal 201 and its retransmission as suppressing electromagnetic signal 232 is not required because all that is needed is to reduce the strength of the interfering electromagnetic signal 201 enough to allow detection of the other ambient electromagnetic signals 202 through 203. In one example, the interfering electromagnetic signal 201 is a modulated radio-frequency communication signal. Although the filter processing delays usually do not permit tracking the actual modulation of the radio-frequency communication signal unless the signal is a repeating signal, typically suppression that suppresses only the carrier frequency of the modulated radio-frequency communication signal is sufficient to reduce the strength of the interfering electromagnetic signal 201 enough to allow detection of the other ambient electromagnetic signals 202 through 203.

For illustrative purposes above, the original interfering electromagnetic signal 201 and its retransmission from the transmitter 230 as suppressing electronic signal 232 were considered independent signals within the protected receiver 240; however, more accurately, the cancelation occurs in the spatial domain within the aperture of the protected antenna 244 of the protected receiver 240. The protected receiver 240 detects any remainder signal following the spatial cancelation.

The compound receiver 200 operates similarly when the interfering electromagnetic signal 201 is not a single ideal sinusoid of the illustrative example above. More generally, more than one of the propagating signals 201 and 202 through 203 is an interfering signal needing suppression and each of these interfering signals is a more complex waveform than a sinusoid.

In one embodiment, the filter 220 spectrographically separates the monitored electrical signal 212 across the frequency bins 224. The filter 220 assigns each of the propagating signals 201 and 202 through 203 represented within the monitored electrical signal 212 to a corresponding one of the frequency bins 224. Each particular frequency bin of the frequency bins 224 has a respective intensity, which is an amplitude of zero or more of the propagating signals 201 and 202 through 203 assigned to the particular frequency bin. The respective intensity is zero for each of the frequency bins 224 assigned none of the propagating signals 201 and 202 through 203.

The filter 220 selects at least one of the propagating signals 201 and 202 through 203 as an interfering signal needing suppression, and the filtered electrical signal 222 represents those selected as needing suppression. The selected propagating signal or signals represented within the filtered electrical signal 222 is those of the propagating signals 201 and 202 through 203 assigned to those of the frequency bins 224 having the respective intensity that are higher than the respective intensity of a remainder of the frequency bins 224. When only a single one of the propagating signals 201 and 202 through 203 causes the interference needing suppression, this single propagating signal is assigned to one of the frequency bins 224 having the respective intensity that is highest among all of the frequency bins 224.

In another embodiment, the filter 220 uses additional characteristics of the propagating signals 201 and 202 through 203 besides frequency for separating the monitored electrical signal 212 across characteristic bins 224. For example, the characteristic bins 224 characterize the propagating signals 201 and 202 through 203 according to one or more of frequency, bandwidth, source direction, and symbol duration. The filter 220 separates the monitored electrical signal 212 across the characteristic bins 224. The filter 220 assigns each of the propagating signals 201 and 202 through 203 represented within the monitored electrical signal 212 to a corresponding one of the characteristic bins 224. The filter 220 selects the selected propagating signal or signals matching a predetermined pattern, which includes a selection threshold on a respective intensity of the zero or more of the propagating signals 201 and 202 through 203 assigned to each of the characteristic bins 224. When only a single one of signals 201 and 202 through 203 causes the interference needing suppression, this single propagating signal is assigned to one of the characteristic bins 224 having a highest intensity among all of the characteristic bins 224.

In one embodiment, the monitor receiver 210 includes a monitor antenna 214 with a monitor phase center, the transmitter 230 includes a transmitter antenna 234 with a transmitter phase center, and the protected receiver 240 includes a protected antenna 244 with a protected phase center. In the spatial domain, a typical antenna has a phase center within the aperture of the antenna. If an antenna could be driven to transmit a spherical wave with the same phase across the entire field of view of the antenna, the phase center corresponds to the center of curvature of the spherical wave. Due to duality of antenna patterns between transmitting and receiving, this phase center is also the phase center of the antenna when receiving instead of transmitting. Highly directional antennas, such as a horn antenna, generally have a well-defined phase center, which is independent of the direction to the source of the interfering propagating signal 201. However, because phase centers can vary somewhat with frequency, the distance between the phase centers of two antennas might vary with the frequency of the interfering propagating signal 201.

The transmitter 230 retransmits the selected propagating signal 232 or signals with the specified timing 252 from the relative position sensor 250. The relative position sensor 250 determines the specified timing 252 from an indirect path length minus a direct path length. The indirect path length is given by a signal processing delay of the filter 220 and a first distance from the transmitter phase center of the transmitter antenna 234 to the protected phase center of the protected antenna 244. The signal processing delay of the filter 220 is measured from the monitor phase center of the monitor antenna 214 through the filter 220 to the transmitter phase center of the transmitter antenna 234. The direct path length given by a second distance from the monitor phase center of the monitor antenna 214 to the protected phase center of the protected antenna 244. The relative position sensor 250 tracks relative movement of the monitor antenna 214, the transmitter antenna 234, and the protected antenna 244. The relative position sensor 250 updates the first distance and the second distance in response to corresponding movement of the monitor phase center, the transmitter phase center, and the protected phase center.

The temporal length of the direct path of the interfering propagating signal 201 is given by the distance between the phase center of the monitor antenna 214 and the phase center of the protected antenna 244, potentially projected along a light of sight of a field of view of the protected antenna 244. The temporal length of the direct path is this distance divided by the speed of light. The temporal length of the retransmission path is the sum of the signal processing delay through the filter 220 plus the distance between the phase centers of the retransmission and protected antennas 234 and 244 divided by the speed of light. The temporal length of the retransmission path minus the temporal length of the direct path is the time difference between the direct and indirect paths, and this time difference multiplied by the frequency of the interfering propagating signal 201 yields the number of cycles of the interfering propagating signal 201 that the indirect path is longer than the direct path.

In one embodiment, the relative position sensor 250 predicts the specified timing 252 that achieves the transmitter 230 retransmitting the interfering propagating signal 232 with the same polarity and 180 degrees out of phase from the original interfering propagating signal 201 directly received at the protected antenna 244 of the protected receiver 240. The transmitter 230 retransmits the selected propagating signal 232 or signals at the specified timing 252 with a same polarity as the original propagating signal 201 or signals. This is accomplished, for example, with an even number of inverting amplifiers along the path from the monitor antenna 214 to the transmitter antenna 234. The relative position sensor 250 measures or otherwise determines filter processing delays and the distances between the phase centers of the various antennas 214, 234, and 244 at the frequency of the interfering propagating signal 201. Measurement techniques of the relative position sensor 250 include LIDAR with accelerometer, gyroscope, etc. The relative position sensor 250 adjusts the specified timing 252 so that, for each interfering signal 201 or signals selected in filter 220, a number of cycles of difference between the indirect and direct path lengths is an integer number of cycles plus a half cycle for each of the interfering signal 201 or signals.

In another embodiment, the relative position sensor 250 predicts the specified timing 252 that achieves the transmitter retransmitting the interfering propagating signal 232 inverted and in phase from the original interfering propagating signal 201 directly received at the protected antenna 244 of the protected receiver 240. The transmitter 230 retransmits the selected propagating signal 232 or signals with an inverted polarity at the specified timing. This is accomplished, for example, with an odd number of inverting amplifiers along the path from the monitor antenna 214 to the transmitter antenna 234. The relative position sensor 250 adjusts the specified timing 252 so that, for each interfering signal 201 or signals selected in filter 220, a number of cycles of difference between the indirect and direct path lengths is an integer number of cycles for each of the interfering signal 201 or signals.

FIG. 3 is a block diagram of a compound receiver 300 of electromagnetic signals 301 and 302 through 303 in accordance with an embodiment of the invention. A known transmitter 360 originally transmits an electromagnetic signal 301 or signals represented within the monitored electrical signal 312.

The protected receiver 340 receives the combination of the electromagnetic signals 302 through 303, the electromagnetic signal 301 or signals originally transmitted from the known transmitter 360, and a selected electromagnetic signal 332 or signals retransmitted from the suppression transmitter 330 with a specified timing 352. The relative position sensor 350 adjusts the specified timing 352 to suppress the electromagnetic signal 301 or signals originally transmitted from the known transmitter 360 with the selected electromagnetic signal 332 or signals retransmitted from the suppression transmitter 330.

FIG. 4 is a block diagram of a compound receiver 400 of electromagnetic signals 401 and 402 through 403 in accordance with an embodiment of the invention. The monitored electrical signal 412 for the filter 420 is the detected electrical signal 442 from the protected receiver 440.

In one embodiment, the protected receiver 440 includes an antenna or electromagnetic sensor and the necessary radio-frequency receiver hardware to initially filter, mix, and/or amplify the received electromagnetic energy. For example, the protected receiver 440 includes a phase array antenna for receiving the combination of the electromagnetic signals 401 and 402 through 403 and the selected electromagnetic signal 432 or signals retransmitted from the transmitter 430. The protected receiver 440 digitizes the monitored electrical signal 412 in preparation for the digital signal process of the filter 420.

For example, the phase array antenna initially scans for any overpowering electromagnetic signal 401, and then the phase array antenna scans to receive the weak electromagnetic signal 403. However, despite the antenna pattern having diminished gain in the direction of the overpowering electromagnetic signal 401 when steered to receive the weak electromagnetic signal 403, a side lobe of the antenna pattern receives the overpowering electromagnetic signal 401 with enough strength to overpower the weak electromagnetic signal 403. The filter 420 selects the overpowering electromagnetic signal 401 for suppression, and the transmitter 430 retransmits the selected electromagnetic signal 432 with a phase from the relative position sensor 450.

Because the protected receiver 440 generates the monitored electrical signal 412, tracking the phase of the overpowering electromagnetic signal 401 could be difficult if the overpowering electromagnetic signal 401 was completely canceled with the selected electromagnetic signal 432. Instead, the strength of the overpowering electromagnetic signal 401 is reduced just enough to allow detection of the other ambient electromagnetic signals 402 through 403. This is signified in FIG. 4 with a thin line for selected electromagnetic signal 432.

Figure 5:
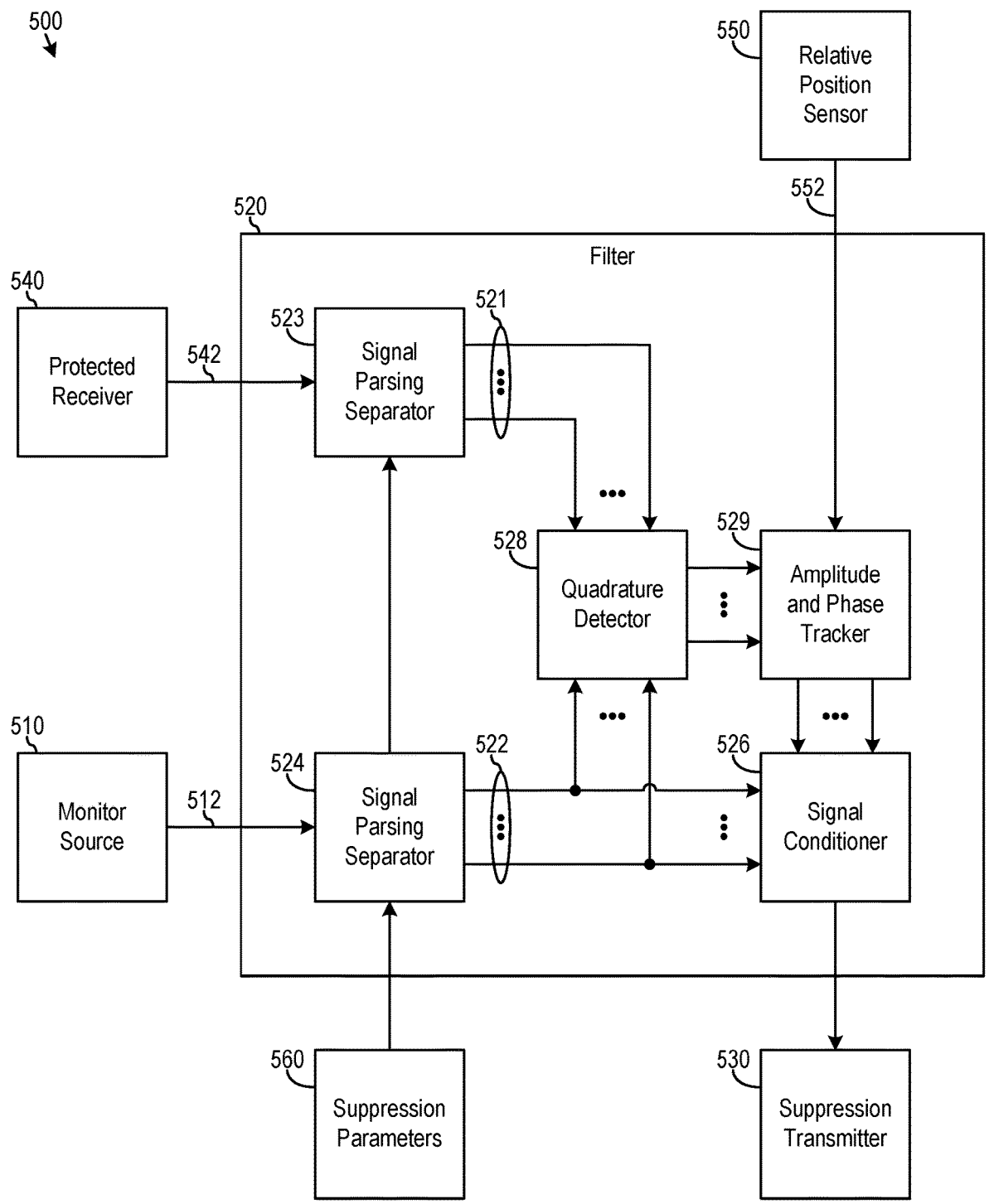
FIG. 5 is a block diagram of a compound receiver of propagating signals in accordance with an embodiment of the invention.

FIG. 5 is a block diagram of a compound receiver 500 of propagating signals in accordance with an embodiment of the invention. FIG. 5 shows details of an embodiment of filter 520 including a quadrature detector for closed loop prediction from the specified timing 552. The monitor source 510 is the monitor receiver 210 of FIG. 2, the source of the monitored electrical signal 312 of FIG. 3, or the protected receiver 440 of FIG. 4. FIG. 5 shows a direct connection from protected receiver 540 to the filter 520, but the corresponding connection in FIG. 2, FIG. 3, and FIG. 4 is the dashed line connection via the relative position sensor 250, 350, and 450, respectively.

The filter 520 generates filtered electrical signal or signals 522 representing at least one selected propagating signal isolated from the propagating signals represented within the monitored electrical signal 512. Signal parsing separator 524 isolates selected propagating signals as specified in preset or real-time suppression parameters 560. The suppression parameters 560 specify what types or levels of signals to remove from the received energy. The suppression parameters 560 also typically specify signal power levels and other signal parameters that the compound receiver 500 should not cancel. For example, the suppression parameters 560 specify frequency or characteristic bins and specify suppression of those bins with respective intensities above a specified threshold, and all additional signals are omitted from filtered electrical signal or signals 522. The filter 520 also generates a feedback electrical signal or signals 521 representing at least one selected propagating signal isolated from the combination represented within the detected electrical signal 542 from the protected receiver 540. Signal parsing separator 523 separates the same propagating signal or signals as signal parsing separator 524 in one-to-one correspondence.

Signal conditioner 526 combines the filtered electrical signal or signals 522 representing the selected propagating signal or signals with the appropriate amplitude and phase from amplitude and phase tracker 529. Signal conditioner 526 also compensates for non-ideal transmitter 530. For example, signal conditioner 526 pre-emphasizes the amplitude of higher frequencies having diminished amplification in transmitter 530 and advances the timing of frequencies experiencing higher group delays through transmitter 530.

Transmitter 530 retransmits the selected propagating signal or signals with the appropriate amplitude and phase from amplitude and phase tracker 529.

If the transmitter 530 retransmits each interfering propagating signal with the correct amplitude and phase for perfect cancelation then the corresponding feedback electrical signals 521 are null signals. Otherwise, quadrature detector 528 detects, for each interfering signal selected from the propagating signals, an in-phase component and a quadrature-phase component of the interfering signal represented within the corresponding one of the feedback electrical signals 521 relative to the interfering signal represented within the corresponding one of the filtered electrical signals 522. Together, the in-phase component and the quadrature-phase component specify a phase error of the specified timing of the interfering signal and an amplitude error of the transmitter 530 retransmitting the interfering signal represented within the corresponding one of the filtered electrical signals 522.

For example, if each of the phases of the retransmitted interfering propagating signal is perfect, but the amplitude is incorrect, then the feedback electrical signals 521 from the protected receiver 540 are in-phase with filtered electrical signals 522. Then the quadrature detector 528 detects an in-phase amplitude error of the retransmitted interfering propagating signal. After correcting any amplitude errors, if each of the phases of the retransmitted interfering propagating signal is incorrect, then the feedback electrical signals 521 are out-of-phase with filtered electrical signals 522, and the quadrature detector 528 detects the phase errors of the retransmitted interfering propagating signal. In general, a quadrature detector 528 detects in-phase and out-of-phase components that specify either an essentially null signal indicating complete cancelation or the amplitude and phase errors of the retransmitted interfering propagating signal.

The amplitude and phase tracker 529 processes the in-phase and out-of-phase amplitudes from the quadrature detector 528 to update the initial projection from the relative position sensor 550. The signal conditioner 526 transmits the filtered electrical signals 522 of the propagating signals with the amplitude and phase specified by the amplitude and phase tracker 529.

From the above description of Receiver with Selected Suppression of Propagating Signals, it is manifest that various techniques may be used for implementing the concepts of systems 100, 200, 300, 400, and 500 without departing from the scope of the claims. The described embodiments are to be considered in all respects as illustrative and not restrictive. Each of the systems 100, 200, 300, 400, or 500 disclosed herein may be practiced in the absence of any element that is not specifically claimed and/or disclosed herein. It should also be understood that each of the systems 100, 200, 300, 400, or 500 is not limited to the particular embodiments described herein, but is capable of many embodiments without departing from the scope of the claims.

We claim:

1. A compound receiver of a plurality propagating signals, comprising:
    a monitor receiver for receiving the propagating signals, the monitor receiver for generating a monitored electrical signal representing the propagating signals;
    a filter for generating a filtered electrical signal representing at least one selected propagating signal isolated from the propagating signals represented within the monitored electrical signal;
    a transmitter for retransmitting, with a specified timing, said at least one selected propagating signal represented within the filtered electrical signal;
    a protected receiver for receiving a combination of the propagating signals and said at least one selected propagating signal retransmitted from the transmitter, the protected receiver generating a detected electrical signal representing the combination; and
    a relative position sensor for adjusting the specified timing to suppress said at least one selected propagating signal represented within the detected electrical signal.

2. The compound receiver of claim 1, wherein the plurality of propagating signals is a plurality electromagnetic signals of radio-frequency radiation.

3. The compound receiver of claim 1, wherein said at least one selected propagating signal is a plurality of interfering signals and, for each one of the interfering signals, the relative position sensor is for adjusting the specified timing to suppress said one of the interfering signals represented within the detected electrical signal.

4. The compound receiver of claim 1, wherein the filter is for spectrographically separating the monitored electrical signal across a plurality of frequency bins, with the filter for assigning each of the propagating signals represented within the monitored electrical signal to a corresponding one of the frequency bins.

5. The compound receiver of claim 4, wherein each frequency bin of the frequency bins has a respective intensity, which is an amplitude of zero or more of the propagating signals assigned to the frequency bin, and the respective intensity is zero for each of the frequency bins assigned none of the propagating signals.

6. The compound receiver of claim 5, wherein said at least one selected propagating signal represented within the filtered electrical signal is those of the propagating signals assigned to those of the frequency bins having the respective intensity that are higher than the respective intensity of a remainder of the frequency bins.

7. The compound receiver of claim 6, wherein said at least one selected propagating signal represented within the filtered electrical signal is a single one of the propagating signals assigned to one of the frequency bins having the respective intensity that is highest among all of the frequency bins.

8. The compound receiver of claim 1, wherein the filter is for separating the monitored electrical signal across a plurality of characteristic bins, with the filter for assigning each of the propagating signals represented within the monitored electrical signal to a corresponding one of the characteristic bins.

9. The compound receiver of claim 8, wherein the characteristic bins characterize the propagating signals according to one or more of frequency, bandwidth, source direction, and symbol duration, and the filter selects said at least one selected propagating signal matching a predetermined pattern, which includes a selection threshold on a respective intensity of zero or more of the propagating signals assigned to each of the characteristic bins.

10. The compound receiver of claim 8, wherein said at least one selected propagating signal represented within the filtered electrical signal is a single one of the propagating signals assigned to one of the characteristic bins having a highest intensity among all of the characteristic bins.

11. The compound receiver of claim 1, wherein:
    the monitor receiver includes a monitor antenna with a monitor phase center, the transmitter includes a transmitter antenna with a transmitter phase center, and the protected receiver includes a protected antenna with a protected phase center;

the transmitter is for retransmitting said at least one selected propagating signal with the specified timing; and the relative position sensor is for determining the specified timing from an indirect path length minus a direct path length, the indirect path length given by a signal processing delay of the filter and a first distance from the transmitter phase center to the protected phase center, the signal processing delay of the filter measured from the monitor phase center through the filter to the transmitter phase center, and the direct path length given by a second distance from the monitor phase center to the protected phase center.

12. The compound receiver of claim 11, wherein the relative position sensor tracks relative movement of the monitor antenna, the transmitter antenna, and the protected antenna, and the relative position sensor updates the first distance and the second distance in response to corresponding movement of the monitor phase center, the transmitter phase center, and the protected phase center.

13. The compound receiver of claim 11, wherein:

the transmitter is for retransmitting said at least one selected propagating signal with a same polarity at the specified timing; and the relative position sensor is for adjusting the specified timing specified by the signal processing delay from the monitor phase center through the filter to the transmitter phase center, so that, for each interfering signal of said at least one selected propagating signal, a number of cycles of difference between the indirect and direct path lengths is an integer number of cycles plus a half cycle of the interfering signal.

14. The compound receiver of claim 11, wherein:

the transmitter is for retransmitting said at least one selected propagating signal with an inverted polarity at the specified timing; and the relative position sensor is for adjusting the specified timing specified by the signal processing delay from the monitor phase center through the filter to the transmitter phase center so that, for each interfering signal of said at least one selected propagating signal, a number of cycles of difference between the indirect and direct path lengths is an integer number of cycles of the interfering signal.

15. The compound receiver of claim 14, wherein:

the filter is also for generating a feedback electrical signal representing said at least one selected propagating signal isolated from the combination represented within the detected electrical signal from the protected receiver; and the filter includes a quadrature detector for detecting, for each interfering signal of said at least one selected propagating signal, an in-phase component and a quadrature-phase component of the interfering signal represented within the feedback electrical signal relative to the interfering signal represented within the filtered electrical signal, wherein the in-phase component and the quadrature-phase component together specify a phase error of the specified timing of the interfering signal and an amplitude error of the transmitter retransmitting the interfering signal represented within the filtered electrical signal.

16. The compound receiver of claim 1, wherein the filter is a first filter and the relative position sensor includes:

the filter is also for generating a feedback electrical signal representing said at least one selected propagating signal isolated from the combination represented within the detected electrical signal from the protected receiver; and the filter includes a quadrature detector for detecting, for each interfering signal of said at least one selected propagating signal, an in-phase component and a quadrature-phase component of the interfering signal represented within the feedback electrical signal relative to the interfering signal represented within the filtered electrical signal, wherein the in-phase component and the quadrature-phase component together specify a phase error of the specified timing of the interfering signal and an amplitude error of the transmitter retransmitting the interfering signal represented within the filtered electrical signal.

17. A compound receiver of a plurality electromagnetic signals of radio-frequency radiation, comprising:

a filter for generating a filtered electrical signal representing at least one selected electromagnetic signal isolated from a monitored electrical signal;

a transmitter for retransmitting, with a specified timing, said at least one selected electromagnetic signal represented within the filtered electrical signal;

a protected receiver for receiving a combination of the electromagnetic signals and said at least one selected electromagnetic signal retransmitted from the transmitter, the protected receiver generating a detected electrical signal representing the combination; and a relative position sensor for adjusting the specified timing to suppress said at least one selected electromagnetic signal represented within the detected electrical signal.

18. The compound receiver of claim 17, further comprising:

a monitor receiver for receiving the electromagnetic signals and for generating the monitored electrical signal representing the electromagnetic signals, wherein the filter is for generating the filtered electrical signal representing said at least one selected electromagnetic signal isolated from the electromagnetic signals represented within the monitored electrical signal.

19. The compound receiver of claim 17, wherein the transmitter is a second transmitter, the compound receiver further comprising:

a first transmitter for originally transmitting at least said at least one selected electromagnetic signal represented within the monitored electrical signal, wherein the protected receiver is for receiving the combination of the electromagnetic signals, at least said at least one selected electromagnetic signal originally transmitted from the first transmitter, and said at least one selected electromagnetic signal retransmitted from the second transmitter with the specified timing, and the relative position sensor is for adjusting the specified timing to suppress said at least one selected electromagnetic signal originally transmitted from the first transmitter with said at least one selected electromagnetic signal retransmitted from the second transmitter.

20. The compound receiver of claim 17, wherein the monitored electrical signal for the filter is the detected electrical signal from the protected receiver, which includes a phase array antenna for receiving the combination of the electromagnetic signals and said at least one selected electromagnetic signal retransmitted from the transmitter.

* * * * *